United States Patent Office 3,329,668
Patented July 4, 1967

3,329,668
CHLOROTHIOCARBANILIDE COMPLEXES
Arthur F. McKay, Beaconsfield, Quebec, Canada, assignor to Monsanto Canada Limited, La Salle, Quebec, Canada, a Canadian company
No Drawing. Filed June 29, 1964, Ser. No. 379,039
Claims priority, application Great Britain, Aug. 29, 1960, 29,772/60
3 Claims. (Cl. 260—96.5)

This application is a continuation-in-part of Ser. No. 118,229, filed June 20, 1961, now abandoned.

This invention relates to new and novel methods of controlling the growth of bacteria and to the compositions useful for that purpose.

The new reaction products of this invention are of commercial importance as industrial preservatives, agriculture pesticides and pharmaceuticals.

It is known that various compounds are useful but to varying degrees as bacteriostats. Compounds of this kind are for instance ureas, carbanilides, thiocarbanilides, thionocarbamates, guanidines, biguanides, salicylanilides, amides, amidines, phenols, bisphenols and semicarbazones.

As examples of these bacteriostats the following are illustrative.

Ureas, e.g.:
    1-(4-nitrophenyl)-3-(4-methylphenyl)-urea.
    1-(4-nitrophenyl)-3-(4-chlorophenyl)-urea.
    1-(4-nitrophenyl)-3-(4-methoxylphenyl)-urea.
Carbanilides, e.g.: 3,4,4'-trichlorocarbanilide.
Thiocarbanilides, e.g.:
    3,3',4,4'-tetrachlorothiocarbanilide.
    2,3',4,4',5-pentachlorothiocarbanilide.
Thionocarbamates, e.g.:
    3-nitrophenyl 3,4-dichlorobenzylthionocarbamate.
    3,4-dichlorophenyl 3,4-dichlorophenylthionocarbamate.
Guanidines, e.g.:
    n-Dodecylguanidine.
    Sulfaguanidine.
    2,2'-bis-(3,4-dichlorobenzyl)-1,1'-ethylenediguanidine.
    1,1'-ethylenebis-[2-(3,4-dichlorobenzyl)-guanidine].
    1,1'-hexamethylenebis-(5-p-chlorophenylbiguanide).
    Decamethylenediguanidine.
Salicylanilide, e.g.: 3,3',4',5-tetrachlorosalicylanilide.
Amides, e.g.:
    N-(3,4-dichlorophenyl)-3,4-dichlorocinnamamide.
    Sulfanilamide.
Others, e.g.:
    2,2'-dihydroxy-3,3',5,5',6,6'-hexachlorodiphenylmethane.
    Nitrofurfuralsemicarbazone.
    2,2'-thiobis-4,6-dichlorophenol.
    1,4-phenylenebis-(N-3,4-dichlorobenzyl-acetamidine).

The compounds above mentioned are referred to generically hereinafter as Class A.

The invention comprises the production of adducts for improvement in controlling the growth of bacteria. Such adducts are produced by the reaction of a compound of Class A with selected compounds, for instance 2-pyridones, 2-hydroxy-4,6-dimethylpyrimidine, 2-amino-4,6-dimethylpyrimidine, N-acetylpiperidines, N,N'-diacylpiperazines, 3-amino-5,6-dimethyl-as-triazine, 2-phenyl-3-pyrazolone, N,N-disubstituted acetamides and N-lower alkyl lactams. Products of this invention and method of making the same are outlined hereinafter.

In accordance with this invention there are provided reaction products of 2-pyridones of the general structure

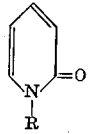

wherein R is a hydrogen atom or a lower alkyl group and any member of the aforementioned Class A. These reaction products can be represented by the structure $_m$Class A:$_n$ 2-pyridone

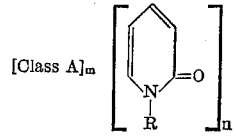

wherein $m$ and $n$ are whole numbers. These materials are definite compounds having characterizing melting points and are not mere physical mixtures of the unreacted bacteriostatic compound and the 2-pyridone. To illustrate such but not limitative of this invention are the following (throughout the examples the word part means parts by weight):

EXAMPLE I

*n-Dodecylguanidine:2-hydroxypyridine* n-Dodecylguanidine (1.0 part) and 2-hydroxypyridine (0.42 part) are heated until a clear melt is obtained. The cooled mixture is crystallised from ether (10 parts) and the precipitate is filtered and dried, M.P. 89–91° C., yield 0.85 part (60% of theory).

*Analysis.*—Percent calculated for $C_{18}H_{34}N_4O$ (equimolar product): C, 67.03; H, 10.63. Found: C, 67.38; H, 10.74.

EXAMPLE II

*2,2'-dihydroxy-3,3',5,5',6,6'-hexachlorodiphenylmethane:2-hydroxypyridine*

2,2' - dihydroxy - 3,3',5,5',6,6' - hexachlorodiphenylmethane (3.0 parts) and 2-hydroxypyridine (3.0 parts) are dissolved in methanol (40 parts) and allowed to stand at 25° for 18 hours. The solution is cooled to 0°, filtered and the precipitate dried, M.P. 183–185° C., yield 3.2 parts.

*Analysis.*—Percent calculated for $C_{18}H_{18}Cl_6NO_3$ (equimolar product): C, 43.07; H, 2.21; Cl, 42.36; N, 2.79. Found: C, 43.12; H, 2.31; Cl, 42.69; N, 2.85.

EXAMPLE III

*2,2'-bis-(3,4-dichlorobenzyl)-1,1'-ethylenediguanidine:2-hydroxypyridine*

2,2' - bis - (3,4 - dichlorobenzyl)-1,1'-ethylenediguanidine (0.92 part) and 2-hydroxypyridine (0.57 part) are dissolved in methanol (12 parts), and the solution is allowed to stand for 1 hour. Dilution with water (10 parts) causes the separation of a precipitate which is filtered and dried, M.P. 102–104° C., yield 1.1 parts (85% of theory). The product crystallizes as the dihydrate.

*Analysis.*—Percent calculated for $$C_{28}H_{30}Cl_4N_8O_2 \cdot 2H_2O:$$

C, 48.85; H, 4.98; H, 16.28. Found: C, 49.17; H, 5.15; Cl, 20.45; N, 15.84.

EXAMPLE IV

*3,3',4',5-tetrachlorosalicylanilide:N-methyl-2-pyridone*

3,3',4',5-tetrachlorosalicylanilide (2.0 parts) is added to a solution of N-methyl-2-pyridone (1.0 part) in methanol (30 parts) and the suspension is stirred at room temperature for 18 hours. The product is isolated by filtration, M.P. 145–156° C., yield 1.47 parts (56% of theory).

Anaylsis.—Percent calculated for $C_{19}H_{14}Cl_4N_2O_3$ (equimolar product): C, 49.59; H, 3.06; Cl, 30.83; N, 6.09. Found: C, 49.94; H, 2.73; Cl. 31.14; N, 5.76.

Further in accordance with this invention there are provided reaction products of a pyrimidine of the general structure

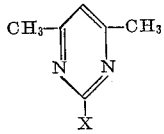

wherein X is a hydroxy or an amino group and any member of the aforementioned Class A. These reaction products can be represented by the structure $_m$Class A:$_n$pyrimidine

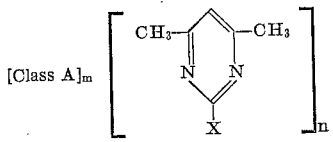

wherein $m$ and $n$ are whole numbers. These materials are definite compounds having characterizing melting points and are not mere physical mixtures of the unreacted bacteriostats and pyrimidine of the foregoing structure. To illustrate such but not limitative of this invention are the following:

EXAMPLE V

*3,3',4,4'-tetrachlorothiocarbanilide:2-hydroxy-4,6-dimethylpyrimidine*

3,3',4,4'-tetrachlorothiocarbanilide (3.66 parts) and 2-hydroxy-4,6-dimethylpyrimidine (1.24 parts) are added to and dissolved in boiling ethanol (20 parts). On cooling the reaction product, namely 1,3-di-(3,4-dichlorophenyl)-thiourea:2-hydroxy-4,6-dimethylpyrimidine, precipitates and is filtered off and dried, yield 3.3 parts (67% of theory), M.P. 141–142° C. Recrystallisation from ethanol does not affect the melting point.

Analysis.—Percent calculated for $C_{19}H_{16}Cl_4N_4SO$ (equimolar product): C, 46.54; H, 3.29; Cl, 28.93; N, 11.43; S, 6.54. Found: C, 46.36; H, 3.24; Cl, 28.90; N, 11.63; S. 6.35.

EXAMPLE VI

*3,3',4,4'-tetrachlorothiocarbanilide:2-amino-4,6-dimethylpyrimidine*

3,3',4,4'-tetrachlorothiocarbanilide (1.83 parts) and 2-amino-4,6-dimethylpyrimidine (0.68 part) are dissolved in hot methanol (8 parts) and the solution then allowed to cool. The precipitate is filtered off and dried, M.P. 157–158° C., yield 1.82 parts (74.5% of theory).

Analysis.—Percent calculated for $C_{19}H_{17}Cl_4N_5S$ (equimolar product). C, 46.65; H, 3.50; Cl, 28.99; N, 14.32; S, 6.55. Found: C, 46.39; H, 3.61; Cl, 29.22; N, 14.34; S, 6.62.

EXAMPLE VII

*n-Dodecylguanidine:2-hydroxy-4,6-dimethylpyrimidine* n-Dodecylguanidine (1.0 part) and 2-hydroxy-4,6-dimethylpyrimidine (1.0 part) are dissolved in methanol (15 parts) and the solution then allowed to stand for 18 hours. Water (20 parts) is then added, and the precipitate filtered off and dried, M.P. 176–178° C., yield 0.81 part (52.3% of theory).

Analysis.—Percent calculated for $C_{19}H_{37}N_5O$ (equimolar product), C, 64.92; H, 10.61; N, 19.92. Found: C, 65.09; H, 10.82; N, 19.78.

EXAMPLE VIII

*Decamethylenediguanidine:2-hydroxy-4,6-dimethylpyrimidine*

Decamethylenediguanidine dihydrochloride (3.29 parts) is dissolved in methanol (30 parts) and the solution is passed through a column filled with a cation-exchange resin. To the effluent is added 2-hydroxy-4,6-dimethylpyrimidine (3.10 parts) and the solution is allowed to stand for 1 hour. Addition of ether gives the product, M.P. 113–115° C., yield 4.52 parts (89.5% of theory). The product is obtained as the hemihydrate.

Analysis.—Percent calculated for $C_{24}N_{44}N_{10}O_2 \cdot \frac{1}{2}H_2O$ (1:2 molar product): C, 56.11; H, 8.83; N, 27.27. Found: C, 56.38; H, 8.86; N, 27.04.

EXAMPLE IX

*1-(4-nitrophenyl)-3-(4-chlorophenyl)-urea:2-hydroxy-4,6-dimethylpyrimidine*

1-(4-nitrophenyl)-3-(4-chlorophenyl)-urea (1.46 parts) is added to a solution of 2-hydroxy-4,6-dimethylpyrimidine (0.74 part) in methanol (10 parts) and the suspension is stirred for 1 hour. The precipitate is filtered and dried, M.P. 228° C., yield 1.91 parts (92% of theory).

Analysis.—Percent calculated for $C_{19}H_{18}ClN_5O_4$ (equimolar product): C, 54.88; H, 4.36; Cl, 8.53; N, 16.85. Found: C, 54.78; H, 4.38; Cl, 8.72; N, 16.25.

EXAMPLE X

*1,4-phenylenebis-(N-3,4-dichlorobenzylacetamidine): 2-hydroxy-4,6-dimethylpyrimidine*

1,4-phenylenebis-(N-3,4-dichlorobenzylacetamidine) (2.54 parts) and 2-hydroxy-4,6-dimethylpyrimidine (1.49 parts) are dissolved in methanol (12 parts). The precipitate which settles out after several minutes is filtered and dried, M.P. 198–199° C., yield 3.04 parts (80% of theory).

Analysis.—Percent calculated for $C_{36}H_{38}Cl_4N_8O_2$ (1:2 molar product): C. 57.17; H, 5.06; Cl. 18.75; N, 14.81. Found: C, 57.35; H, 5.28; Cl, 18.75; N, 14.73.

EXAMPLE XI

*1,1'-hexamethylenebis-(5-p-chlorophenylbiguanide): 2-hydroxy-4,6-dimethylpyrimidine*

1,1'-hexamethylenebis-(5-p-chlorophenylbiguanide) (2.89 parts) is added to a solution of 2-hydroxy-4,6-dimethylpyrimidine (1.48 parts) in methanol (20 parts), and the suspension is stirred for 1 hour. The precipitate is filtered an dried, M.P. 254–256° C. (dec.), yield 2.64 parts (63% of theory). The product is obtained as the monohydrate.

Analysis.—Percent calculated for $C_{34}H_{46}Cl_2N_{14}O_2 \cdot H_2O$ (equimolar product): C, 52.91; H, 6.27; Cl. 9.19; N, 25.41. Found: C, 53.04; H, 6.31; Cl, 9.37; N, 25.77.

EXAMPLE XII

*Sulfamethoxypyridazine:2-amino-4,6-dimethylpyrimidine*

Sulfamethoxypyridazine (1.0 part) is added to a solution of 2-amino-4,6-dimethylpyrimidine (1.0 part) in ethanol (15 parts) and ether (80 parts), and the suspension is stirred for 3 hours. The product is isolated by filtration, and purified by trituration in ether (20 parts), M.P. 183–185° C. yield 1.37 parts (97% of theory).

Analysis.—Percent calculated for $C_{17}H_1N_7O_3S$: C, 50.59; H, 5.25; N, 25.30; S, 7.95. Found: C, 50.44; H, 5.39; N, 24.26; S, 7.82.

Still further in accordance with this invention there are provided reaction products of an N,N'-diacylpiperizine of the general structure

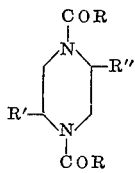

wherein R, R' and R" are the same or different each representing a hydrogen atom or a lower alkyl group and any member of the aforementioned Class A. These reaction products can be represented by the structure $_m$Class A:$_n$N,N'-diacylpiperazine

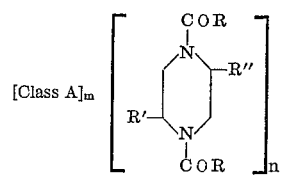

wherein $m$ and $n$ are whole numbers. These materials are definite compounds having characterizing melting points and are not mere physical mixtures of the unreacted bacteriostats and an N,N'-diacylpiperazine of the foregoing structure. To illustrate such but not limitative of this invention are the following:

EXAMPLE XIII

*3,3,4,4'-tetrachlorothiocarbanilide:N,N'-diacetylpiperazine*

3,3',4,4'-tetrachlorothiocarbanilide (1.0 part) is added to a solution of N,N'-diacetylpiperazine (1.0 part) in methanol (15 parts) and the suspension is stirred for 1 hour. The precipitate is filtered off and dried, M.P. 150–151° C., yield 0.87 part (71% of theory).

*Analysis.*—Percent calculated for $C_{34}H_{30}Cl_8N_6S_2O_2$ (2:1 molar product): C, 45.26; H, 3.35; Cl, 31.44; N, 9.31; S, 7.11. Found: C, 45.27; H, 3.46; Cl, 31.21; N, 9.25; S, 7.04.

EXAMPLE XIV

*3-nitrophenyl-3,4-dichlorobenzylthionocarbamate: N,N'-diacetylpiperazine*

3-nitrophenyl-3,4-dichlorobenzylthionocarbamate (1.42 parts) is added to a solution of N,N'-diacetylpiperazine (0.86 part) in methanol (3 parts), and the suspension is stirred for one hour. The precipitate is filtered off and dried, M.P. 100–120° C. Yield 1.73 parts (98% of theory).

*Analysis.*—Percent calculated for $C_{36}H_{34}Cl_4N_6O_8S_2$ (2:1 molar product): C, 48.88; H, 3.88; Cl, 16.03; N, 9.50; S, 7.25. Found: C, 48.82; H, 3.76; Cl, 15.84; N, 9.31; S, 7.19.

EXAMPLE XV

*3,4-dichlorophenyl-3,4-dichlorophenylthionocarbamate: N,N'-diacetylpiperazine*

3,4-dichlorophenyl 3,4-dichlorophenylthionocarbamate (1.83 parts) is added to a solution of N,N'-diacetylpiperazine (1.0 part) in methanol (10 parts), and the suspension is stirred for 1 hour. The precipitate is filtered off and dried, M.P. 116–118° C., yield 1.47 parts (65% of theory).

*Analysis.*—Percent calculated for $C_{34}H_{28}Cl_8N_4C_4S_1$ (2:1 molar product): C, 45.16; H, 3.12; Cl, 31.77; N, 6.20; S. 7.09. Found: C, 45.09; H, 3.10; Cl, 31.41; N, 6.56; S, 7.06.

EXAMPLE XVI

*1-(4-nitrophenyl)-3-(4-methoxyphenyl)urea:N,N'-diacetylpiperazine*

1-(4-nitrophenyl)-3 - (4 - methoxyphenyl) - urea (1.43 parts) is added to a solution of N,N'-diacetylpiperazine (1.00 part) in methanol (12 parts) and the suspension is stirred for one hour. The product, M.P. 175–198° C., is recovered by filtration, yield 1.34 parts (72% of theory).

*Analysis.*—Percent calculated for $C_{36}H_{40}N_8O_{10}$ (2:1 molar product): C, 58.07; H, 5.41; N, 15.05. Found: C, 57.66; H, 5.33; N, 14.74.

EXAMPLE XVII

*3,3',4',5-tetrachlorosalicylanilide:N,N'-diacetylpiperazine*

3,3',4',5-tetrachlorosalicylanilide (2.0 parts) and N,N'-diacetylpiperazine (2.0 parts) are dissolved in methanol (320 parts) by warming, and the solution is allowed to stand at room temperature for 18 hours. The solution is then diluted with water (200 parts) and the precipitate is filtered and dried, M.P. 169–171° C., yield 2.31 parts (89% of theory).

*Analysis.*—Percent calculated for $C_{34}H_{28}Cl_8N_4O_6$ (2:1 molar product: C, 46.81; H, 3.24; Cl, 32.52; N, 6.42. Found: C, 47.09; H, 3.37; Cl, 32.28; N, 6.19.

EXAMPLE XVIII

*2,2'-dihydroxy-3,3',5,5',6,6'-hexachlorodiphenylmethane:N,N'-diacetylpiperazine*

2,2' - dihydroxy - 3,3',5,5',6,6' - hexachlorodiphenylmethane (1.0 part) and N,N'-diacetylpiperazine (1.0 part) are dissolved in methanol (20 parts) at room temperature, and the solution is allowed to stand for one hour. Dilution with water (10 parts) gives a precipitate, M.P. 131–132° C., yield 1.0 part (82.3% of theory).

EXAMPLE XIX

*3,3',4,4'-tetrachlorothiocarbanilide:N,N'-diacetyl-trans-2,5-dimethylpiperazine*

3,3',4,4' - tetrachlorothiocarbanilide (3.66 parts) is added to a solution of N,N'-diacetyl-trans-2,5-dimethylpiperazine (1.98 parts) in methanol (80 parts) and the suspension is stirred for 3 hours. The product is recovered by filtration, M.P. 159–160° C., yield 4.37 parts (94.0% of theory).

*Analysis.*—Percent calculated for $C_{36}H_{34}Cl_8N_6S_2O_2$ (2:1 molar product): C, 46.67; H, 3.68; Cl, 30.49; N, 9.03. Found: C, 46.30; H, 3.71; Cl, 30.21; N, 9.09.

EXAMPLE XX

*Sulfanilamide:N,N'-diacetyl-trans-2,5-dimethylpiperazine*

Sulfanilamide (3.44 parts) is added to a solution of N,N'-diacetyl-trans-2,5-dimethylpiperazine (1.98 parts) in methanol (16 parts) and the suspension is stirred for 1 hour. The product is recovered by filtration, M.P. 151–153° C., yield 3.6 parts (81.2% of theory).

*Analysis.*—Percent calculated for $C_{22}H_{34}N_6O_6S_2$ (2:1 molar product): C, 48.69; H, 6.31; N, 15.49; S, 11.81. Found: C, 48.39; H, 6.56; N, 15.20; S, 11.77.

EXAMPLE XXI

*3,4,4'-trichlorocarbanilide:N,N'-diacetyl-trans-2,5-dimethylpiperazine*

3,4,4'-trichlorocarbanilide (3.16 parts) is added to a solution of N,N'-diacetyl - trans-2,5,-dimethylpiperazine (1.98 parts) in methanol (20 parts) and the suspension is stirred for one hour. The product is recovered by filtration, M.P. 200–202° C., yield 4.0 parts (96% of theory).

*Analysis.*—Percent calculated for $C_{36}H_{36}Cl_6N_6O_4$ (2:1 molar product): C, 52.13; H, 4.37; Cl, 25.65; N, 10.13. Found: C, 52.60; H, 4.47; Cl, 25.64; N, 10.34.

EXAMPLE XXII

*3,3',4',5-tetrachlorosalicylanilide:N,N'-diacetyl-trans-2,5-dimethylpiperazine*

3,3',4',5-tetrachlorosalicylanilide (7.0 parts) is added to a solution of N,N'-diacetyl-trans-2,5-dimethylpiperazine (1.98 parts) in methanol (60 parts) and the suspension is stirred for one hour. The product is recovered by filtration, M.P. 183–185° C., yield 8.0 parts (99.8% of theory). The melting point rises to 186–188° C. on recrystallization from methanol.

*Analysis.*—Percent calculated for $C_{36}H_{32}Cl_8N_4O_6$ (2:1 molar product): C, 48.03; H, 3.58; Cl, 31.51; N, 6.22. Found: C, 48.33; H, 3.79; Cl, 31.05; N, 6.15.

EXAMPLE XXIII

*3,4,4'-trichlorocarbanilide:N,N'-diacetyl-2-methylpiperazine*

3,4,4'-trichlorocarbanilide (1.0 part) is added to a solution of N,N'-diacetyl-2-methylpiperazine (1.0 part) in methanol (20 parts), and the suspension is stirred for 18 hours. The product is isolated by filtration, M.P. 203–204° C., yield 0.82 part (63% of theory).

*Analysis.*—Percent calculated for $C_{35}H_{34}Cl_6N_6O_4$ (2:1 molar product): C, 51.56; H, 4.20; Cl, 26.09; N, 10.31. Found: C, 51.73; H, 4.11; Cl, 26.15; N, 10.26.

EXAMPLE XXIV

*Sulfamethoxypyridazine:N,N'-diformylpiperazine*

Sulfamethoxypyridazine (1.0 part) is added to a solution of N,N'-diformylpiperazine (1.0 part) in methanol (10 parts) and ether (80 parts), and the suspension is stirred for one hour. The product is isolated by filtration, M.P. 105–107° C., yield 0.89 part (60% of theory).

*Analysis.*—Percent calculated for $C_{17}H_{22}N_6O_5S$ (equimolar product): C, 48.32; H, 5.25; N, 19.89; S, 7.59. Found: C, 48.11; H, 5.15; N, 19.31; S, 7.45.

In another aspect of this invention there are provided the reaction products of an N-acetylpiperidine of the general structure:

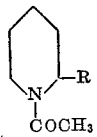
COCH₃ wherein R is a hydrogen atom or a lower alkyl group and any member of the aforementioned Class A. These reaction products can be represented by the structure mClass A:nN-acetylpiperidine:

[Class A]m 
$$\begin{bmatrix} \phantom{xx} \\ \phantom{xx} \end{bmatrix}_n$$
COCH₃ wherein *m* and *n* are whole numbers. These materials are definite compounds having characterizing melting points and are not mere physical mixtures of the unreacted bacteriostatic compound and an N-acetylpiperidine of the foregoing structure. To illustrate such but not limitative of this invention are the following:

EXAMPLE XXV

*3,3',4',5-tetrachlorosalicylanilide:N-acetylpiperidine*

3,3',4',5-tetrachlorosalicylanilide (2.0 parts) and N-acetylpiperidine (2.0 parts) are dissolved in methanol (40 parts) and the solution allowed to stand for one hour. Dilution with water (16 parts) gives a precipitate which on dry melts at 88–90° C. Yield 2.27 parts (84% of theory).

*Analysis.*—Percent calculated for $C_{20}H_{20}Cl_4N_2O_3$ (equimolar product): C, 50.23; H, 4.22; Cl, 29.66; N, 5.86. Found: C, 50.32; H, 4.32; Cl, 29.45; N, 6.05.

EXAMPLE XXVI

*3,3',4,4'-tetrachlorothiocarbanilide:N-acetyl-2-methylpiperidine*

3,3',4,4'-tetrachlorothiocarbanilide (1.0 part) is added to a solution of N-acetyl-2-methylpiperidine (0.76 part) in ether (5 parts) and the suspension is stirred for two hours. The product is recovered by filtration, M.P. 99–101° C., yield 1.19 parts (86% of theory).

*Analysis.*—Percent calculated for $C_{21}H_{23}Cl_4N_3OS$ (equimolar product): C, 49.71; H, 4.57; Cl, 27.96; N, 8.28; S, 6.32. Found: C, 49.80; H, 4.16; Cl, 28.45; N, 8.09; S, 6.85.

In still another aspect of this invention there are provided reaction products of 3-amino-5,6-dimethyl-as-triazine of the general structure:

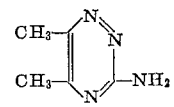

and any member of the aforementioned Class A. These reaction products can be represented by the structure mClass A:n3-amino-5,6-dimethyl-as-triazine

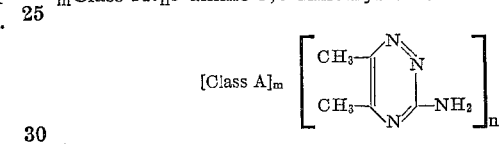

wherein *m* and *n* are whole numbers. These materials are definite compounds having characterizing melting points and are not mere physical mixtures of the unreacted bacteriostats and a 3-amino-5,6-dimethyl-as-triazine of the foregoing structure. To illustrate such but not limitative of this invention are the following:

EXAMPLE XXVII

*3,3'4,4'-tetrachlorothiocarbanilide:3-amino-5,6-dimethyl-as-triazine*

3,3',4,4'-tetrachlorothiocarbanilide (1.83 parts) and 3-amino-5,6-dimethyl-as-triazine (0.74 part) are dissolved in hot methanol (20 parts), and then the solution is allowed to cool. The precipitate is filtered off and dried, M.P. 140–141° C., yield 1.51 parts by weight (62.5% of theory).

*Analysis.*—Percent calculated for $C_{18}H_{16}Cl_4N_6S$ (equimolar product): C, 44.09; H, 3.30; Cl, 28.93; N, 17.14; S, 6.54. Found: C, 44.18; H, 3.44; Cl, 29.20; N, 16.94; S, 6.64.

EXAMPLE XXVIII

*5-nitrofurfuralsemicarbazone:3-amino-5,6-dimethyl-as-triazine*

5-nitrofurfuralsemicarbazone (1.0 part) is added to a solution of 3-amino-5,6-dimethyl-as-triazine (1.0 part) in methanol (15 parts), and the suspension is stirred for 1 hour. The precipitate is filtered and dried, M.P. 190–191° C., yield 1.32 parts (81% of theory).

*Analysis.*—Percent calculated for $C_{11}H_{14}N_8O_4$ (equimolar product): C, 40.83; H, 4.37; N, 34.70. Found: C, 40.72; H, 4.47; N, 34.16.

EXAMPLE XXIX

*3,4,4'-trichlorocarbanilide:3-amino-5,6-dimethyl-as triazine*

3,4,4'-trichlorocarbanilide (1.0 part) is added to a solution of 3-amino-5,6-dimethyl-as-triazine (1.0 part in methanol (15 parts), and the suspension is stirred for one hour. The precipitate is filtered and dried, M.P. 180–181.5° C., yield 0.63 part (45% of theory).

*Analysis.*—Percent calculated for $C_{18}H_{17}Cl_3N_6O$ (equimolar product): C, 49.17; H, 3.96; Cl, 24.19; N, 19.12. Found: C, 48.73; H, 4.41; Cl, 24.29; N, 18.87.

EXAMPLE XXX

*Sulfaguanidine:3-amino-5,6-dimethyl-as-triazine*

Sulfaguanidine (5.0 parts) and 3-amino-5,6-dimethyl-as-triazine (5.0 parts) are dissolved in hot ethanol (150 parts) and the solution is allowed to cool. The product is isolated by filtration, M.P. 157–159° C., yield 7.0 parts (76% of theory).

*Analysis.*—Percent calculated for $C_{17}H_{26}N_{12}SO_2$ (1:2 molar product): C, 44.04; H, 5.67; N, 36.35; S, 6.93. Found: C, 43.56; H, 6.12; N, 36.19; S, 7.33.

In a still further aspect of this invention there are provided reaction products of an N,N-disubstituted acetamide of the general structure $$CH_3CONR_2$$

wherein R is a lower alkyl group or an aryl group and any member of the aforementioned Class A. These reaction products can be represented by the structure $_m$Class A:$_n$acetamide $$[\text{Class A}]_m[CH_3CONR_2]_n$$

wherein *m* and *n* are whole numbers. These materials are definite compounds having characterizing melting points and are not mere physical mixtures of the unreacted bacteriostatic compound and an acetamide of the foregoing structure. To illustrate such but not limitative of this invention are the following:

EXAMPLE XXXI

*3,3′,4,4′-tetrachlorothiocarbanilide:N,N-diisopropylacetamide*

3,3′,4,4′-tetrachlorothiocarbanilide (7.32 parts) and N,N-diisopropylacetamide (2.9 parts) are dissolved in boiling ethanol (30 parts) and the solution then allowed to cool. The precipitate is filtered off and dried, M.P. 100–105° C. The ethanolic filtrate is evaporated to dryness at room temperature, and the residue crystallized from petroleum ether (30–75°) to yield an additional quantity of product melting at 100–105° C. The total yield is 8.76 parts (86% of theory).

*Analysis.*—Percent calculated for $C_{21}H_{25}Cl_4N_3OS$ (equimolar product): N, 8.25; S, 6.29. Found: N, 8.26; S, 6.63.

EXAMPLE XXXII

*2,3′,4,4′,5-pentachlorothiocarbanalide:N,N-diisopropylacetamide*

A solution of 2,3′,4,4′,5-pentachlorothiocarbanalide (0.66 part) and N,N-diisopropylacetamide (0.56 part) in ethanol (16 parts) is allowed to stand for two hours. Concentration of the solution gives the product, M.P. 120–121° C., yield 0.62 part (70.6% of theory).

*Analysis.*—Percent calculated for $C_{21}H_{24}Cl_5N_3OS$ (equimolar product): N, 7.72; S, 5.90. Found: N, 7.77; S, 5.83.

EXAMPLE XXXIII

*3,3′,4,4′-tetrachlorothiocarbanilide:N,N-diphenylacetamide*

N,N-diphenylacetamide (2.0 parts) is dissolved in methanol (32 parts), and thereafter 3,3′,4,4′-tetrachlorothiocarbanilide (3.18 parts) is added. The suspension is stirred at room temperature for 17 hours, and the precipitate filtered off and dried, M.P. 129.5–131.5° C., yield 3.36 parts, (65% of theory). Recrystallisation from methanol does not alter the melting point.

*Analysis.*—Percent calculated for $C_{27}H_{21}Cl_4N_3OS$ (equimolar product): C, 56.17; H, 3.67; Cl, 24.57; N, 7.28; S, 5.55. Found: C, 56.42; H, 3.77; Cl, 24.42; N, 7.37; S, 5.52.

EXAMPLE XXXIV

*3,4,4′-trichlorocarbanilide:N,N-diphenylacetamide*

3,4,4′-trichlorocarbanilide (2.0 parts) is added to a solution of N,N-diphenylacetamide (2.0 parts) in methanol (15 parts). The suspension is stirred for one hour at room temperature and the product is recovered by filtration, M.P. 153–155° C., yield 2.94 parts (88% of theory).

*Analysis.*—Percent calculated for $C_{27}H_{22}Cl_3N_3O_2$ (equimolar product): C, 61.55; H, 4.21; Cl, 20.19; N, 7.98. Found: C, 61.21; H, 4.30; Cl, 20.53; N, 8.10.

In accordance with another aspect of this invention there are provided reaction products of an N-lower alkyl lactam of the general structure

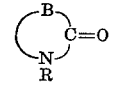

wherein R is a lower alkyl group and B is an alkylene group and any member of the aforementioned Class A. These reaction products can be represented by the structure $_m$Class A:$_n$lactam

wherein *m* and *n* are whole numbers. These materials are definite compounds having characterizing melting points and are not mere physical mixtures of the unreacted bacteriostatic compound and a cyclic amide of the foregoing structure. To illustrate such but not limitative of this invention are the following:

EXAMPLE XXXV

*3,4,4′-trichlorocarbanilide:N-methyl-2-pyrrolidone*

3,4,4′-trichlorocarbanilide (1.0 part) is added to a solution of N-methyl-2-pyrrolidone (1.0 part) in methanol (1.0 part), and the suspension is stirred for one hour. The precipitate is filtered and dried, M.P. 142–143° C., yield 0.65 part (50% of theory).

*Analysis.*—Percent calculated for $C_{49}H_{45}Cl_9N_8O_5$ (3:2 molar product): C, 51.39; H, 3.96; Cl, 27.88; N, 9.79. Found: C, 51.67; H, 4.04; Cl, 27.88; N, 9.59.

EXAMPLE XXXVI

*3,3′,4,4′-tetrachlorothiocarbanilide:N-methyl-ε-caprolactam*

3,3′,4,4′-tetrachlorothiocarbanilide (1.12 parts) is added to a solution of N-methyl-ε-caprolactam (1.27 parts) in methanol (10 parts) and the suspension is stirred for one hour. The precipitate is filtered and dried, M.P. 126–127° C., yield 0.68 part (45% of theory).

*Analysis.*—Percent calculated for $C_{20}H_{21}Cl_4N_3OS$ (equimolar product): C, 48.70; H, 4.29; Cl, 28.76; N, 8.52; S, 6.50. Found: C, 48.76; H, 4.44; Cl, 28.73; N, 8.36; S, 6.46.

EXAMPLE XXXVII

*3,3′,4′,5-tetrachlorosalicylanilide:N-methyl-2-pyrrolidone*

3,3′,4′,5-tetrachlorosalicylanilide (1.0 part) and N-methyl-2-pyrrolidone (1.0 part) are added to and dissolved in boiling methanol (15 parts), and the solution allowed to stand for one hour. Dilution with water (20 parts) gives the product, M.P. 98–99.5° C., yield 0.78 part (60.6% of theory).

*Analysis.*—Percent calculated for $C_{49}H_{39}Cl_{12}N_5O_8$ (3:2 molar product): C, 47.04; H, 3.14; N, 5.59. Found: C, 47.35; H, 3.17; N, 5.16.

EXAMPLE XXXVIII

*2,2′-dihydroxy-3,3′,5,5′,6,6′-hexachlorodiphenylmethane: N-methyl-2-pyrrolidone*

2,2′-dihydroxy - 3,3′,5,5′,6,6′-hexachlorodiphenylmethane (1.0 part) and N-methyl-2-pyrrolidone (1.0 part) are added to and dissolved in boiling methanol (15 parts) and the solution is allowed to stand for one hour. Addition of water (20 parts) causes the precipitation of the product, M.P. 93–94° C., yield 1.19 parts (94% of theory).

Analysis.—Percent calculated for $C_{49}H_{42}Cl_{18}N_2O_8$ (3:2 molar product): C, 41.48; H, 2.56; Cl, 44.95; N, 1.98. Found: C, 41.64; N, 2.78; Cl, 44.32; N, 1.96.

Further to this invention there are provided reaction products of a pyrazolone of the general structure

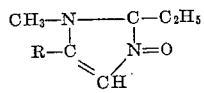

wherein R is a hydrogen atom or a lower alkyl group and any member of the aforementioned Class A. These reaction products can be represented by structure $_m$Class A:$_n$pyrazolone

[Class A]$_m$ 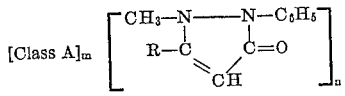

wherein m and n are whole numbers. These materials are definite compounds having characterizing melting points and are not mere physical mixtures of the unreacted bacteriostatic compound and a pyrazolone of the foregoing structure. To illustrate such but not limitative of this invention are the following:

EXAMPLE XXXIX

*3,3',4,4'-tetrachlorothiocarbanilide:1,5-dimethyl-2-phenylpyrazolone-3*

3,3',4,4'-tetrachlorothiocarbanilide (1.83 parts) is added to a solution of 1,5-dimethyl-2-phenylpyrazolone-3 (1.13 parts) in methanol (8 parts) and the suspension is stirred for one hour. The precipitate is filtered and dried, M.P. 132–134° C., yield 2.49 parts (90% of theory).

Analysis.—Percent calculated for $C_{24}H_{20}Cl_4N_4OS$ (equimolar product): C, 52.00; H, 3.64; Cl, 25.59; N, 10.10; S, 5.78. Found: C, 52.00; H, 3.62; Cl 25.62; N, 9.95; S, 5.77.

EXAMPLE XL

*3,4,4'-trichlorocarbanilide:1,5-dimethyl-2-phenylpyrazolone-3*

3,4,4'-trichlorocarbanilide (1.57 parts) is added to a solution of 1,5-dimethyl-2-phenylpyrazolone-3 (1.13 parts) in methanol (12 parts) and the suspension is stirred for two hours. The precipitate is filtered and dried, M.P. 179–180° C., yield 2.28 parts (91% of theory).

Analysis.—Percent calculated for $C_{24}H_{21}Cl_3N_4O_3$ (equimolar product): C, 57.21; H, 4.20; Cl, 21.11; N, 11.12. Found: C, 57.66; H, 4.25; Cl, 20.91; N, 10.96.

EXAMPLE XLI

*3,3',4,4'-tetrachlorothiocarbanilide:1-methyl-2-phenylpyrazolone-3*

3,3',4,4'-tetrachlorothiocarbanilide (3.66 parts) and 1-methyl-2-phenylpyrazolone-3 (1.79 parts) are added to and dissolved in hot ethanol (60 parts). The product crystallizes on cooling, M.P. 157–158° C., yield 4.0 g. (51.7% of theory).

Analysis.—Percent calculated for $C_{23}H_{19}Cl_3N_4O_2$ (equimolar product): C, 51.13; H, 3.36; Cl, 26.26; N, 10.37; S, 5.93. Found: C, 51.09; H 3.40; Cl, 26.25; N, 10.31; S, 5.88.

The new products of this invention are potent bacteriostats for gram-positive organisms. Hydrogen bonded adducts of this invention have bacteriostatic activities as great as one hundred fold over that of untreated bacteriostatic compounds.

Effect in increasing the bacteriostatic activity is apparent in the comparison of the activity of for instance untreated 3,3',4,4'-tetrachlorothiocarbanilide with that of the same compound when treated with 2-hydroxy-4,6-dimethylpyrimidine. This adduct inhibited the growth of Staphylococcus pyogenes (penicillin sensitive) at a concentration of 1 part in 819,200,000 as compared with a minimum concentration of 1 part in 51,200,000 of 3,3',4,4'-tetrachlorothiocarbanilide.

In the table below is illustrated the improvement in activity of bacteriostatic compounds modified in accordance with this invention. In particular is disclosed the improved activity of the modified compounds on specific organisms. The improved activity stated in the last column of the table over that of the untreated compound is from four to a hundred fold. The treated compounds are identified in the table by reference to the examples in this application.

Halving dilutions were done on each compound, the initial dilution being 1/1,000 with serial dilutions up to 1/819,000,000. 0.1 millilitre of a 1/10 dilution of an 8-hour old culture of the test organism was in each case added to incubation tubes containing the various concentrations of the test compounds and the tubes incubated for a period of twenty-four hours at 37° C. The tubes were then examined to determine the presence of growth of the organism. This examination was done visually and the presence of growth indicated by turbidity. The medium employed was "Difco" nutrient broth. The results of the tests are tabulated in the table the substituted thionocarbamate may be identified by reference to the example.

TABLE

| Organism | Compound | Activity | Improved Number of fold |
|---|---|---|---|
| Staph. pyogenes (S) | V | 819,000,000 | 16 |
|  | VI | 204,800,000 | 4 |
|  | XIV | 40,960,000 | 8 |
|  | XXIII | 40,800,000 | 6 |
|  | XXIV | 4,000 | 4 |
|  | XXXVI | 40,960,000 | 4 |
| Staph. pyogenes (R) | V | 204,800,000 | 8 |
|  | XIV | 20,480,000 | 4 |
|  | XVII | 40,960,000 | 4 |
|  | XXIII | 40,800,000 | 6 |
|  | XXIV | 4,000 | 4 |
|  | XXXVI | 40,960,000 | 4 |
| Sarcina lutea | I | 40,960,000 | 4 |
|  | II | 128,000,000 | 8 |
|  | VII | 10,240,000 | 4 |
|  | XXIII | 4,000 | 4 |
|  | XXIV | 4,000 | 4 |
|  | XXXVI | 162,000,000 | 16 |
| Strept. faecalis | II | 128,000,000 | 8 |
|  | VII | 1,280,000 | 4 |
|  | XIII | 81,920,000 | 4 |
|  | XVII | 20,480,000 | 4 |
|  | XXIII | 10,280,000 | 100 |
|  | XXV | 20,480,000 | 4 |
|  | XXXVI | 40,960,000 | 4 |
| E. coli #198 | IV | 102,000,000 | 20 |
|  | I | 2,560,000 | 8 |
|  | XIII | 80,000 | 8 |
|  | XIV | 160,000 | 4 |
| S. pullorum | XXXIII | 160,000 | 16 |
|  | X | 160,000 | 8 |
|  | XVII | 160,000 | 16 |
|  | XXXVII | 640,000 | 64 |
| Pr. mirabilis | IV | 640,000 | 64 |
| Pr. vulgaris | II | 160,000 | 8 |
|  | II | 160,000 | 8 |
|  | XXXIII | 40,000 | 4 |

The bacteriostatic compounds of Class A set forth hereinbefore include compounds having tranquilizing, antidiabetic, herbicidal, fungicidal and/or insecticidal properties among other useful properties and in accordance with this invention it has been observed that these compounds of the Class A, which are so characterized upon reacting with 2-pyridones, 2-hydroxypyrimidines, aminopyrimidines, aminotriazines, N,N-disubstituted acetamides, N-substituted lactams, N-acetylpiperidines, pyrazolones and N,N-diacylpiperazines provide reaction products having greatly improved activity in these respects.

The reaction products described hereinbefore are useful in controlling the growth of bacteria, e.g. Staphylococcus pyogenes by exposing the bacteria to same. The growth of bacteria on various surfaces, e.g. human or animal skin, other surfaces can be controlled or prevented by applying to such surfaces any one or mixture of reaction products described hereinbefore or a composition or formulation containing same. The amount of reaction product employed to control will vary obviously with the species of bacteria with the amount of bacteria on a surface, the particular reaction product and the like.

Although the reaction products of this invention are useful per se in controlling a wide variety of noxious life, it is preferable that they be supplied to the noxious life or to the environment of the noxious life in a dispersed form in a suitable extending agent.

In the instant specification and appended claims it is to be understood that the term "dispersed" is used in its widest possible sense. When it is said that the reaction products of this invention are dispersed, it means that the particles of the reaction products of this invention may be molecular in size and held in true solution in a suitable organic solvent. It means further that the particles may be colloidal in size and distributed throughout a liquid phase in the form of suspensions or emulsions or in the form of particles held in suspension by wetting agents. It also includes particles which are distributed in a semi-solid viscous carrier such as petrolatum or soap or other ointment base in which they may be actually dissolved in the semi-solid or held in suspension in the semi-solid with the aid of suitable wetting emulsifying agents. The term "dispersed" also means that the particles may be mixed with and distributed throughout a solid carrier providing a mixture in particulate form, e.g. pellets, granules, powders, or dusts and powders.

The exact concentration of the reaction products this invention employed in combatting or controlling noxious life can vary considerably provided the required dosage (i.e. toxic or lethal amount) thereof is supplied to the noxious life or to the environment of the noxious life.

When the extending agent is a liquid or a mixture of liquids (e.g. as in solutions, suspensions, emulsions, etc.) the concentration of the reaction product employed to supply the desired dosage generally will be in the range of 0.001 to 50 percent by weight. When the extending agent is a semi-solid or solid, the concentration of the reaction product employed to supply the desired dosage generally will be in the range of 0.1 to 25 percent by weight.

What is claimed is:

1. A reaction product having the structure

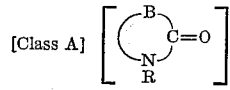

wherein Class A is a carbanilide compound selected from a group consisting of tetrachlorothiocarbanilide and trichlorocarbanilide, B is lower alkylene, R is lower alkyl.

2. The adduct, 3,3',4,4'-tetrachlorothiocarbanilide:N-methyl-ε-caprolactam.

3. The adduct, 3,4,4'-trichlorocarbanilide:N-methyl-2-pyrrolidone.

References Cited
UNITED STATES PATENTS

| | | | |
|---|---|---|---|
| 2,846,398 | 8/1958 | Beaver et al. | 260—96.5 |
| 2,881,157 | 4/1959 | O'Neill | 260—96.5 |
| 2,887,474 | 5/1959 | Alter et al. | 260—96.5 |

ALEX MAZEL, *Primary Examiner.*

HENRY R. JILES, WALTER A. MODANCE,
*Examiners.*

JOHN M. FORD, *Assistant Examiner.*